Feb. 28, 1928. G. A. KERESTES. Re. 16,890

MOTION PICTURE AND TARGET APPARATUS.

Original Filed May 20, 1919

3 SHEETS—SHEET 1.

WITNESSES

J. Halal Bradley

Lois Unneman.

INVENTOR

Geo. A. Kerestes by W. G. Doolittle

Attorney.

Feb. 28, 1928. G. A. KERESTES. Re. 16,890

MOTION PICTURE AND TARGET APPARATUS.

Original Filed May 20, 1919

3 SHEETS—SHEET 2.

WITNESSES

J. Hebel Bradley.

Lois Unneman.

INVENTOR

Geo. A. Kerestes by W. G. Doolittle

Attorney.

Feb. 28, 1928.

G. A. KERESTES.

MOTION PICTURE AND TARGET APPARATUS.

Re. 16,890

Original Filed May 20, 1919

3 SHEETS—SHEET 3.

WITNESSES

J. Hebel Bradley

Lois Vineman.

INVENTOR

Geo. A. Kerestes by W. G. Dodinle

Attorney.

Reissued Feb. 28, 1928. Re. 16,890

UNITED STATES PATENT OFFICE.

GEORGE A. KERESTES, OF SELLERSVILLE, PENNSYLVANIA, ASSIGNOR, BY MESNE ASSIGNMENTS, TO BERTRAM G. CASE, OF PITTSBURGH, PENNSYLVANIA.

MOTION-PICTURE AND TARGET APPARATUS.

Application filed May 20, 1919, Serial No. 298,406. Renewed December 1, 1920, Serial No. 427,657. Original No. 1,389,877, dated September 6, 1921. Application for reissue filed May 28, 1927. Serial No. 195,131.

My invention relates to improvements in motion picture machines, and also to motion picture target apparatus of the class employing a target, a picture projecting device, and electrical connections between the target and the projector actuated by the impact of a bullet or projectile on the target for automatically stopping the movement of the picture film.

In the employment of motion picture machines, it is desirable at times to present a still picture on the screen instead of a moving picture, thus, for example, where the moving picture is being utilized in connection with a lecture or a talk, or, more frequently, when the motion picture machine is being employed in connection with a target apparatus wherein the projecting device is stopped by means actuated by the impact of a bullet or by firing a shot, etc.

Prior to my invention, the stoppage of the picture film in order to produce the still picture has been accomplished by stopping all of the moving parts of the machine, the result being that the machine soon becomes destroyed or inefficient, due to the sudden stoppage of its rapidly moving parts.

An object of the present invention is to provide simple and efficient means for stopping the movement of a picture film for the purposes above described, without affecting or stopping the rapidly moving parts of the machine.

A further object of my invention is to provide a new and improved motion picture target apparatus.

Figure 2:
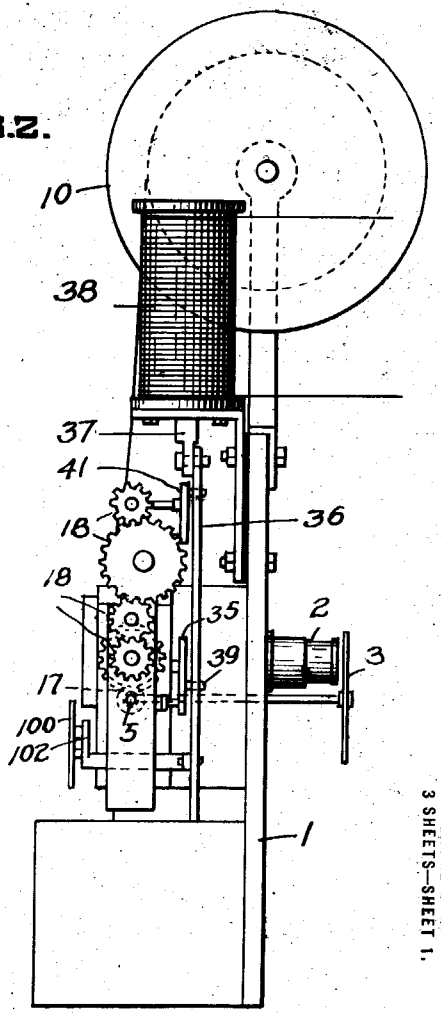
Figure 1:
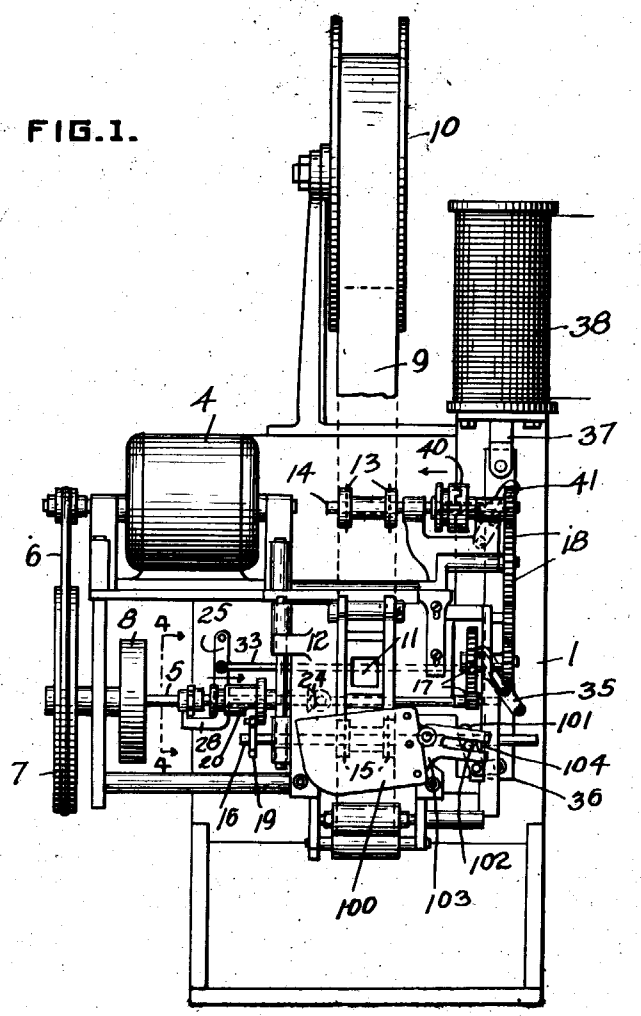
Figure 4:
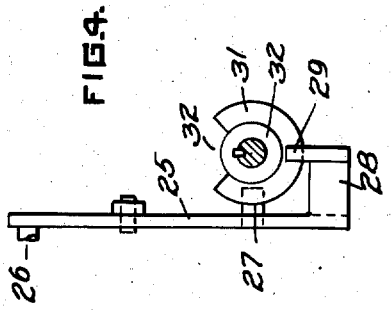
Figure 5:
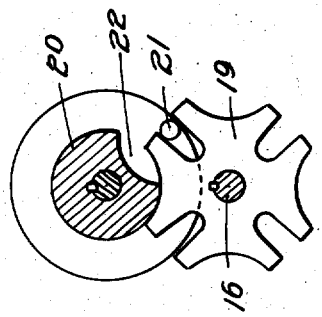
Figure 3:
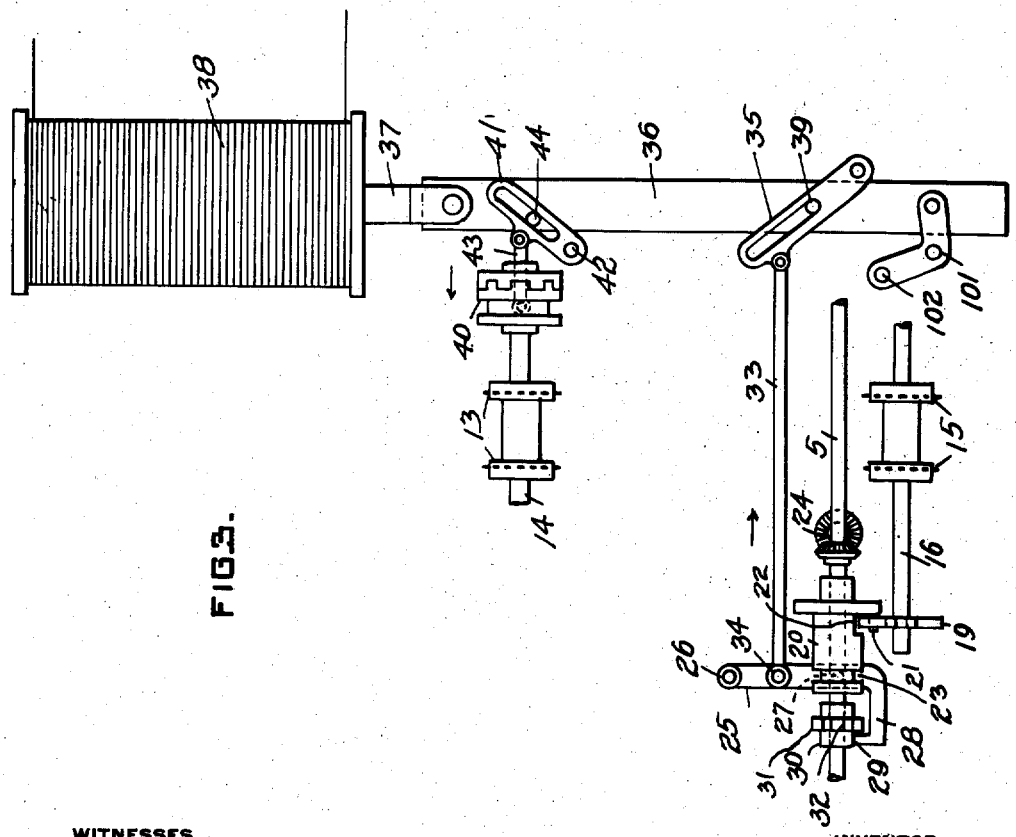

In the accompanying drawing which illustrate an application of my invention:

Fig. 1 is a rear elevational view of a motion picture machine embodying my invention;

Fig. 2, a side elevational view of the machine;

Fig. 3, an enlarged detail view particularly showing the film feed sprockets, the lower one being the intermittently driven sprocket, and the means for stopping the rotation of said sprockets;

Fig. 4, a detail view, partly in section, the section being taken on line 4—4 of Fig. 1;

Fig. 5, a detail view of the Geneva movement employed; and

Figure 6:
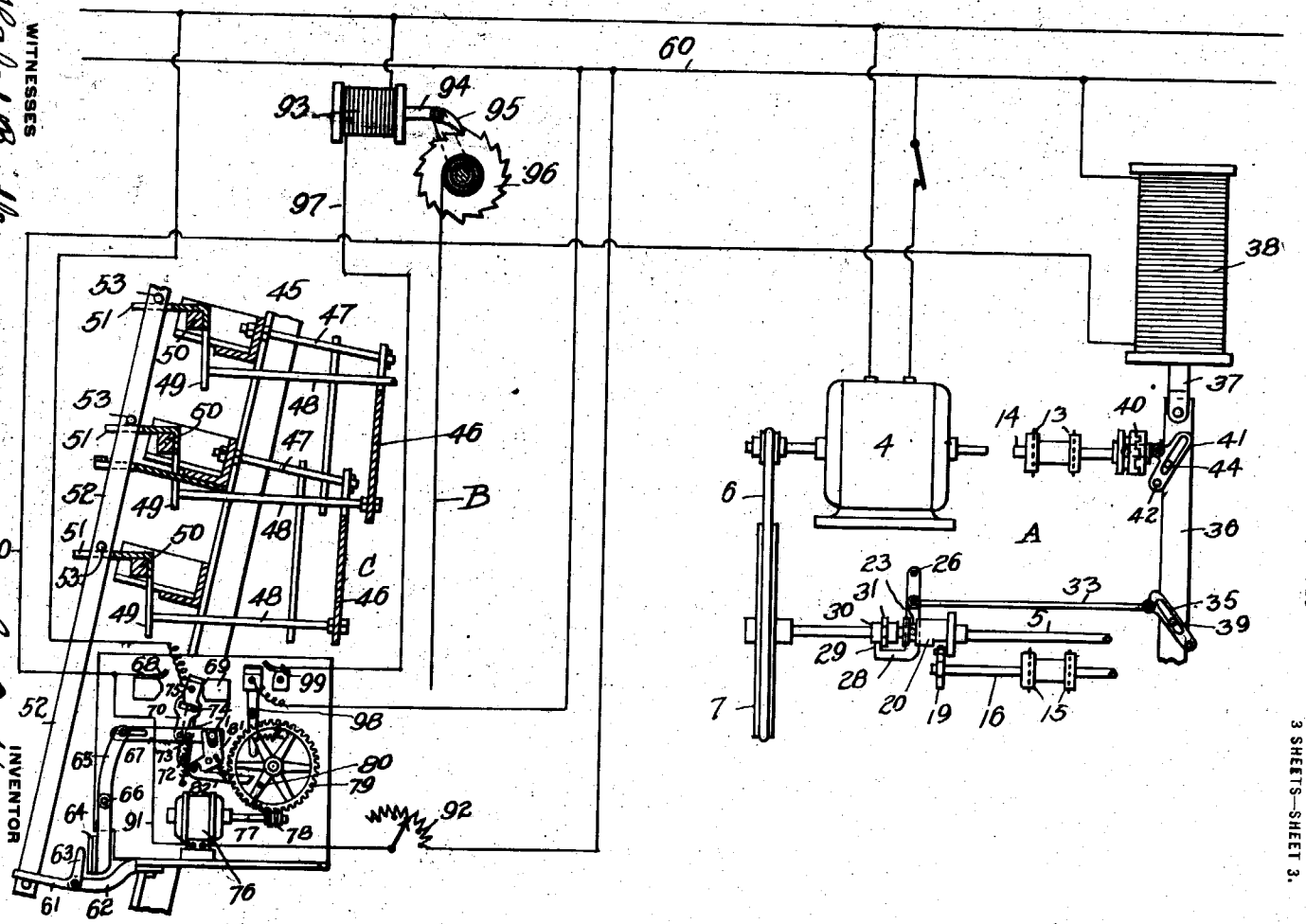

Fig. 6, a diagrammatic view showing the target apparatus, timing mechanism, a portion of the moving picture mechanism, and the electrical connections between the said parts.

Referring to the drawings, A designates a moving picture machine, B a perforable screen onto which the pictures are designed to be projected; and C a target or back wall.

The moving picture machine, as illustrated, includes a casing 1, of any suitable construction, the lens 2, and a shutter 3. As shown, the movable parts are driven by means of an electric motor 4, although the machine may be operated manually. The main drive shaft 5 is connected with the motor by means of a belt 6 and drive wheel 7. 8 designates a fly wheel mounted on shaft 5. The film tape 9 is designed to be fed down through the machine from reel 10, over opening 11 of frame 12, in the usual manner.

The film passes over and is fed through the machine by the feed wheels or sprockets 13 mounted on a shaft 14, and the usual intermittently driven wheels or sprockets 15, the latter being mounted on shaft 16. Shaft 14 is driven from the main drive shaft 5 through gearing 17 and 18, and the shaft 16 is also driven from shaft 5. The means illustrated for driving the intermittently driven shaft 16 include a star wheel 19, of the Geneva type, mounted on and keyed to the shaft 16, a shiftable sleeve element 20 carrying a pin 21 and having a clearance space 22 for the star wheel and a groove 23, said element 20 being mounted and slidable on drive shaft 5. The shutter 3, as illustrated, is driven from shaft 5 by means of gearing 24.

The elements above described, with the exception of the shiftable sleeve element 20, are of known construction and are arranged to operate a motion picture machine in the usual manner. It should also be understood that my invention is not limited to the combination of these elements with means for arresting the movement of the film without stopping the motor and the rapidly moving parts of the machine, for my invention may be embodied in motion picture machines having mechanism differing considerably from that shown.

A characteristic and important feature of my invention is the provision of means cooperating with the intermittently driven film feed wheel or sprocket, or said wheel or sprocket and the other film feed wheel or sprocket of a moton picture machine, whereby the movement of the film through the machine may be stopped for a desired period of time without stopping or affecting the other movable parts of the machine.

The mechanism employed for stopping the rotation of the intermittently driven shaft 16, or the feed wheels or sprockets 13, in addition to the element 20, includes a movable bent downwardly extending arm 25, pivotally secured to the framework of the machine with its fulcrum point at 26. Arm 25 carries a pin 27, the latter being entered in the groove 23 of element 20. The lower portion of the arm is bent, as shown at 28, and said portion 28 is formed with a flange or bent up portion 29. 30 designates a stop element mounted on shaft 5, the function of which is to prevent an inward movement of arm 25, and the consequent shifting of element 20 until the desired instant. That is to say, the element 20 should be permitted to slide only when a complete picture is shown on the screen. Said stop element 30 is formed with a collar 31 having a laterally extending slot 32 through which the flange 29 of arm 25 may pass to permit the inward movement of said arm and element 20. The movement of arm 25 is effected by a horizontally extending rod 33 having one end attached to arm 25 at 34 and its opposite end connected with a link 35, the latter being pivotally secured to a portion of the frame.

As illustrated and as preferred, the movement of the rod 33 is effected by means of a bar 36 connected with and adapted to be moved by the core 37 of a solenoid 38; and for this purpose, bar 36 is provided with a pin 39 entered in the pivotally mounted link 35. It is evident, however, that bar 36 may be moved by other than electrical means.

For the purpose of stopping the rotation of the feed sprockets 13 on shaft 14, when desired, I provide a clutch mechanism 40. Said clutch mechanism, as shown, is operated by means of the bar 36, a pivotally supported link 41 secured at 42 to the frame, a rod 43 extending from the link to the clutch, and a pin 44 on bar 36 cooperating with the link.

The parts just described are particularly illustrated in the detail view of Fig. 3, and, as there shown, are arranged to drive the film feed wheels. An upward movement of the bar 36 will release the clutch mechanism 40 and also shift the slidable element 20, thereby throwing pin 21 free of the star wheel 19 as the former revolves with the element 20. A movement of the bar 36 in the opposite direction or into the position shown by Fig. 3 will permit the film to be fed through the machine, with the usual intermittent movement.

The mechanism herein described provides simple and efficient means for automatically stopping for a predetermined period the movement of the film, thereby enabling a still picture to be shown on the screen, this being accomplished without stopping the other movable parts of the motion picture machine.

In the present invention I have shown the motion picture machine and the above described means for stopping the picture film in connection with a target apparatus and electrically operated means between the target and the machine designed to be operated by the impact of a bullet or projectile on the target.

The target structure 45 is similar to the target structure shown in a patent issued to me November 27, 1923, No. 1,475,493. As shown herein, it includes a plurality of loosely suspended impact plates 46, said plates being suspended from rods 47 and adapted to be moved inwardly the desired distance by the impact of a bullet. Each plate is provided with a push rod 48 adapted to strike against an angle plate 49, the latter being mounted on a tilting bar 50. Bars 50 also carry a vertical row of plates 51 having divided ends adapted to straddle a vertically movable switch actuating rod 52. Rod 52 is provided with a series of pins 53 which engage the divided ends of plates 51. It will be understood that an inward movement of an impact plate will tilt a bar 50, and that, when this occurs, the switch actuating rod 52 will be raised. Raising the rod is designed to complete an electric circuit for the purpose of effecting certain operations hereinafter described.

In the embodiment of my invention as shown by the drawings, the electrical current employed in connection with the various parts of the apparatus is obtained from the main line 60.

An upward movement of the switch actuating rod 52 caused by the impact of a bullet against one of the plates 46, acting through the means above described, will operate a toggle arm 61 pivotally secured to an arm 62 of the frame. Toggle arm 61 engages the lower end of rod 52, and, upon the upward movement of said rod, arm 63 of toggle 61 is moved to make contact with an enlarged portion 64 disposed at the lower end of a pivotally mounted curved arm 65. Arm 65 is fulcrumed at 66, and has its upper end attached to a slotted and horizontally extending arm 67.

The elements just described constitute a portion of an electrical switch device and timing apparatus, said switch and timing apparatus forming the subject of United States Letters-Patent No. 1,503,834, issued to me August 5, 1924.

As shown herein, 68 designates a fixed contact strip of the switch mechanism and 70 a movable switch arm designed to be thrown by the movement of the horizontally movable arm 67. The connection between the arm 67 and the switch arm 70 includes a pivotally mounted arm 71 secured at 72 to the frame of the machine and pivotally connected with arm 67 by a pin 73. Arm 71 at its upper end is provided with a pin 74 adapted to operate in a slot 75 of the switch arm 70. As shown, a movement of bar 67 to the left will cause switch arm 70 to move from stop block 69 to contact point 68, thereby completing an electric circuit to solenoid 38 of the motion picture machine, and at the same time completing an electric circuit to a motor 76 of the timing mechanism.

The timing mechanism includes, in addition to the motor, motor shaft 77, having a worm 78 thereon, a pinion wheel 79 meshing with said worm, a striking pin 80 carried on the pinion, a pivoted arm 81 having its ends divided and engaging a pin passed through arm 67, and a pivotally mounted arm 82 secured to the divided arm 81.

It will be understood that the closing of the circuit 90 leading to solenoid 38 energizes the core 37 of the said solenoid to raise the bar 36, thereby throwing out the clutch mechanism 40 and moving the slidable element 20 on drive shaft 5 to disconnect said element from the star wheel carried on the intermittently driven shaft 16, thus stopping the film feed wheels 13 and 15. The time the movement of the film is arrested depends upon the speed of rotation of the wheel 79. It will be understood that, with the closing of the circuit 90 to the solenoid 38, a circuit 91 is completed to the motor 76, thereby starting said motor and the timing mechanism.

The speed of the motor is controlled by means of a regulator 92. From the drawings and a reference to the above-mentioned Patent No. 1,503,834, it will be understood that the period of rest of the film will depend on the time it takes for the striking pin 80 to make a revolution, for it will be noted that, upon each revolution of striking pin 80, said pin will come into contact with rod 82, thereby causing the switch arm 70 to be brought from engagement with contact point 68 into engagement with stop block 69.

For the purpose of moving the screen or curtain B, I provide a solenoid 93, the core 94 of which is employed for moving a dog 95 on a ratchet wheel 96 mounted on the shaft of the screen reel. The circuit 97 for solenoid 93 is also made and broken by means of the striking pin 80 on pinion 79. This is effected by employing a pivotally mounted switch arm 98 adapted to be moved into contact with contact plate 99.

100 designates a movable shutter, preferably made of colored mica, this shutter being adapted to be moved over and away from the opening 11 (see Fig. 1) by the movement of the bar 36 and the connections between said bar and shutter. Said connections include a toggle arm 101 carrying a pin 102, a pivotally mounted plate 103, the latter having a slotted portion 104 into which the pin 102 is entered. The function of the shutter 100 is to change the color of the picture thrown onto the screen during the time the movement of the film is arrested. It will be understood that the shutter may be omitted if desired, although I find it of advantage for the purpose of enabling the bullet holes made in the screen B to be more readily seen, and also this shutter greatly diminishes the heat generated by the light rays.

It will be understood that, when my invention is to be employed without the target apparatus, any suitable means, operable by a lecturer at any desired point, is arranged to energize the core 37 of the solenoid to throw out the clutch mechanism 40 and move the slidable element on the drive shaft 5 to stop the movement of the film wheels 13 and 15, as above described.

What I claim is:—

1. In apparatus of the class described, a picture frame having a projection opening, and shutter for coaction with a picture film, a drive shaft, a driven shaft, co-acting elements on the said shafts to intermittently drive the film relatively to said frame including a slidable member mounted on the drive shaft, means for shifting the slidable member out of operative engagement with the driven shaft, stop means for preventing a movement of the slidable member to disengage the driven shaft and arrest the movement of the film except when a complete picture is in register with the frame opening, including a rotatable member mounted on the drive shaft and cooperating with the shifting means.

2. In apparatus of the class described, a picture frame having a projection opening and shutter for coaction with a picture film, a drive shaft, means for drivingly connecting the shutter and the drive shaft, a driven shaft, co-acting elements on the shafts for intermittently driving the film relatively to said frame including a slidable member mounted on the drive shaft, means for shifting the slidable member out of operative engagement with the driven shaft, and a rotatable stop member carried on the drive shaft for controlling the shifting movement of the slidable member.

3. In apparatus of the class described, a picture frame having a projection opening and shutter for coaction with a picture film, a drive shaft, means for drivingly connecting the shutter and the drive shaft, a driven shaft, co-acting elements on the shafts for intermittently driving the film relatively to said frame including a slidable member mounted on the drive shaft, means for automatically arresting the movement of the film when a complete picture is in register with the frame opening without stopping the movement of the shutter, including means for shifting the slidable element, and a rotatable stop element mounted on the drive shaft and arranged to cooperate with the shifting means.

4. In apparatus of the class described, a picture frame having a projection opening and shutter for coaction with a picture film, a drive shaft, means for drivingly connecting the shutter and the drive shaft, means for intermittently driving the film relatively to said frame including a driven shaft, and co-acting elements on said shafts including a slidable member mounted on the drive shaft, means for automatically arresting the movement of the film when a complete picture is in register with the frame opening without stopping the movement of the shutter, including means for shifting the slidable element, and a rotatable stop element mounted on the drive shaft and arranged to cooperate with the shifting means, said stop element having a collar formed with a laterally extending slot through which a portion of the shifting means is passed when the slidable member is shifted.

5. In picture projecting apparatus, a picture frame, a driving shaft, a shutter for coaction with said film and said frame, means for drivingly connecting the shutter and driving shaft, a film-operating shaft, co-acting elements to intermittently drive the film-operating shaft from the driving shaft to move the film relatively to said frame, one of said elements being disengageable from the remainder thereof when the pictures of the film are in the frame, means to prevent the disengagement of the elements when the said pictures are out of the frame, and means operable to effect the said disengagement to enable the movement of the film to be stopped with a picture always in the frame without stopping the operation of the shutter.

6. In picture projecting apparatus, a picture frame, a shutter for coaction with said film and said frame, a driving shaft, a film-operating shaft, co-acting elements to intermittently drive the film operating shaft from the driving shaft to move the film relatively to said frame, one of said elements being slidable on one of said shafts to break the driving connection when the pictures of a film are in the frame, stop means on the last mentioned shaft to prevent movement of the sliding element when the said pictures are out of frame and normally inactive means, operable to effect the said disengagement, to enable the movement of the film to be stopped with a picture always in the frame without stopping the operation of the shutter.

7. In picture projecting apparatus, a driving shaft, a film-operating shaft, a co-acting star wheel element and a slidable element to intermittently drive the second shaft from the first shaft, said elements being driven by said shafts and mounted thereon, a segmental stop on one of the shafts to prevent movement of the sliding element when the pictures of the film are out of frame, and normally inactive means operable to disengage the slidable element from the star wheel element when the pictures are in frame, to enable the movement of the film to be stopped with a picture always in frame and without stopping operation of the shutter.

In testimony whereof I affix my signature.

GEORGE A. KERESTES.